United States Patent
Tuan

(10) Patent No.: US 6,950,998 B1
(45) Date of Patent: Sep. 27, 2005

(54) PLACE-AND-ROUTE WITH POWER ANALYSIS

(75) Inventor: Tim Tuan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 56 days.

(21) Appl. No.: 10/421,251

(22) Filed: Apr. 22, 2003

(51) Int. Cl.⁷ .............................................. G06F 17/50

(52) U.S. Cl. .................. 716/2; 716/6; 716/13; 716/14; 703/14

(58) Field of Search ........................ 716/2, 6, 10, 14; 703/14

(56) References Cited

U.S. PATENT DOCUMENTS

| 5,831,864 A | 11/1998 | Raghunathan et al. |
| 6,345,379 B1 | 2/2002 | Khouja et al. |
| 2002/0069396 A1 * | 6/2002 | Bhattacharya et al. ......... 716/7 |

\* cited by examiner

*Primary Examiner*—Thuan Do
(74) *Attorney, Agent, or Firm*—Mike Wallace; LeRoy D. Maunu

(57) ABSTRACT

Method and apparatus for placing and routing an electronic circuit design. Various embodiments are disclosed for analyzing placed and/or routed designs for power consumption characteristics and timing characteristics. New designs are iteratively generated in order to reduce power consumption and satisfy timing requirements of the design.

17 Claims, 4 Drawing Sheets

PLACE-AND-ROUTE WITH POWER ANALYSIS

FIELD OF THE INVENTION

The present invention generally relates to analysis of expected power consumption during stages of placing and routing an electronic circuit design.

BACKGROUND

Power consumption is increasingly a prime consideration in the design of electronic components. Advancing circuit technology has allowed the development of devices such as mobile telephones, person digital assistants, digital cameras, and devices that combine various features of each. These devices are increasingly seen as necessary in our daily activities.

In these and other example devices convenience is an important factor in determining commercial success, and portability is of particular concern for mobile devices. For example, if a device is too heavy or requires recharging a battery too frequently, the device may fail in the marketplace, even if the device has noteworthy functional capabilities. A larger battery may provide a longer charge life, but the added weight may make holding or carrying the device more cumbersome. Because the power consumed by a device largely influences the size of the battery, power usage is an important consideration in designing a device.

Power usage also affects heat dissipation requirements in electronic devices. The more power consumed by a device, the more heat that must be dissipated. Failure to suitably provide for heat dissipation may create undesirable hot spots and in extreme cases cause injury. One approach to address heat dissipation issues is to design a structure that adequately dissipates the heat consistent with other design requirements, such as the device's footprint. However, this approach may unduly complicate the manufacture of the device and lead to increased costs. A more desirable approach would be to reduce the power consumed by the device, thereby reducing the amount of heat needing to be dissipated.

A method and apparatus that address the aforementioned problems, as well as other related problems, are therefore desirable.

SUMMARY OF THE INVENTION

In various embodiments, the invention provides methods and apparatus for placing and routing an electronic circuit design. Various embodiments are disclosed for analyzing placed and/or routed designs for power consumption characteristics and timing characteristics. New designs are iteratively generated in order to reduce power consumption and satisfy timing requirements of the design.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
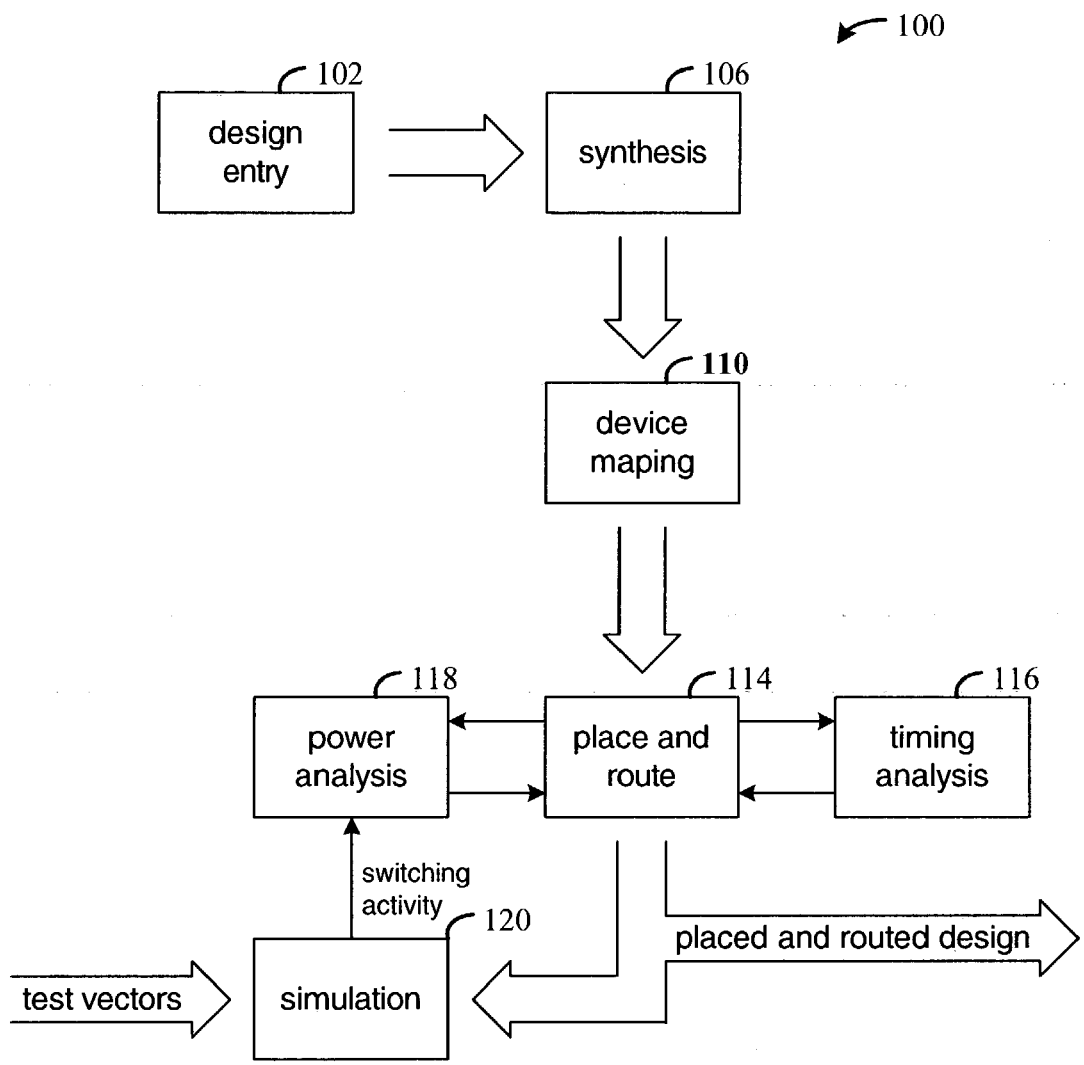
FIG. 1 is a functional block diagram of an arrangement in which power analysis is performed in conjunction with placing and routing an electronic circuit design in accordance with various embodiments of the invention.

FIG. 1 is a functional block diagram of an arrangement 100 in which power analysis is performed in conjunction with placing and routing an electronic circuit design in accordance with various embodiments of the invention. An electronic circuit design is created via one or more design entry tools 102. Various tools are available to support the different ways in which a design may be specified. For example, different tools are available that support schematic capture, entry of code in a hardware description language (HDL), and high-level design with a graphical user interface.

Synthesis tool 106 receives an input design specification, such as set forth in an HDL, and generates a netlist representation of the design. The netlist is input to a device mapping tool 110, which generates design information that describes specific logic cells that are associated with the elements of the netlist. Once the logic cells have been determined, the logic cells can be placed at selected locations on a device, and signal paths between cells can be routed with a place and route tool 114. It will be appreciated that place and route may be performed as separate processes or performed together, depending on implementation requirements.

In the place-and-route phase(s) of the design flow, power analysis is performed in conjunction with timing analysis in order to reduce power consumption of the placed-and-routed design and remain within the timing constraints imposed by the designer.

If only timing-driven place and route were performed, the implemented design may be less power-efficient because the delay of a net is not strongly correlated with the net's power consumption. That is, a fast net is not necessarily a low-power net. This is because a net's delay is a function of its capacitance, whereas a net's power consumption is a function of its capacitance and switching activity. The switching activity of a net is the frequency at which the net changes state, for example transitions/unit-time. The switching activity directly affects power consumption because most power is consumed only when a net switches from a low logic level to a high logic level. From this it may be observed that a net with an average capacitance and a high switching activity would have an average delay and high power consumption if only timing-driven placement and routing were performed.

Place and route tool 114 may be a conventional tool that is adapted to use information from both timing analysis 116 and power analysis 118. In an example embodiment, simulation is introduced into the design flow during the place and route phase(s), and switching activity data that is generated during simulation is provided to the power analysis tool 118. The power analysis tool estimates the power performance of a net as the product of a capacitance value and the switching activity associated with the net.

The capacitance levels of the nets are determined based on a prior characterization of the silicon technology in which the design is to be implemented. The characteristics of the silicon may be used to determine capacitance levels of particular routing resources of the target device, and the capacitance levels of the routing resources may be used to determine the capacitance of the nets.

In one embodiment, the place and route tool evaluates each net in the design using a cost function having the switching activity levels and capacitance levels (or capacitance values represented as delay values) as parameters. Those nets with the highest costs are optimized. The place and route tool repeats the cycle of placing and routing, analyzing, and optimizing until selected stopping criteria are met. Depending on the relative importance of timing versus power in a particular design, the cost function may be adjusted to place more weight on one factor or another to place the optimization emphasis on the associated characteristic.

In another embodiment, the place and route tool may be adapted to perform the simulation in each iteration in order to provide the power analysis tool with switching activity information that most accurately characterizes the current state of the placed and routed design. Alternatively, the simulation may be performed in only some of the iterations in order to save time. For example, the simulation may be performed every $n^{th}$ iteration.

Figures 2A, 2B:
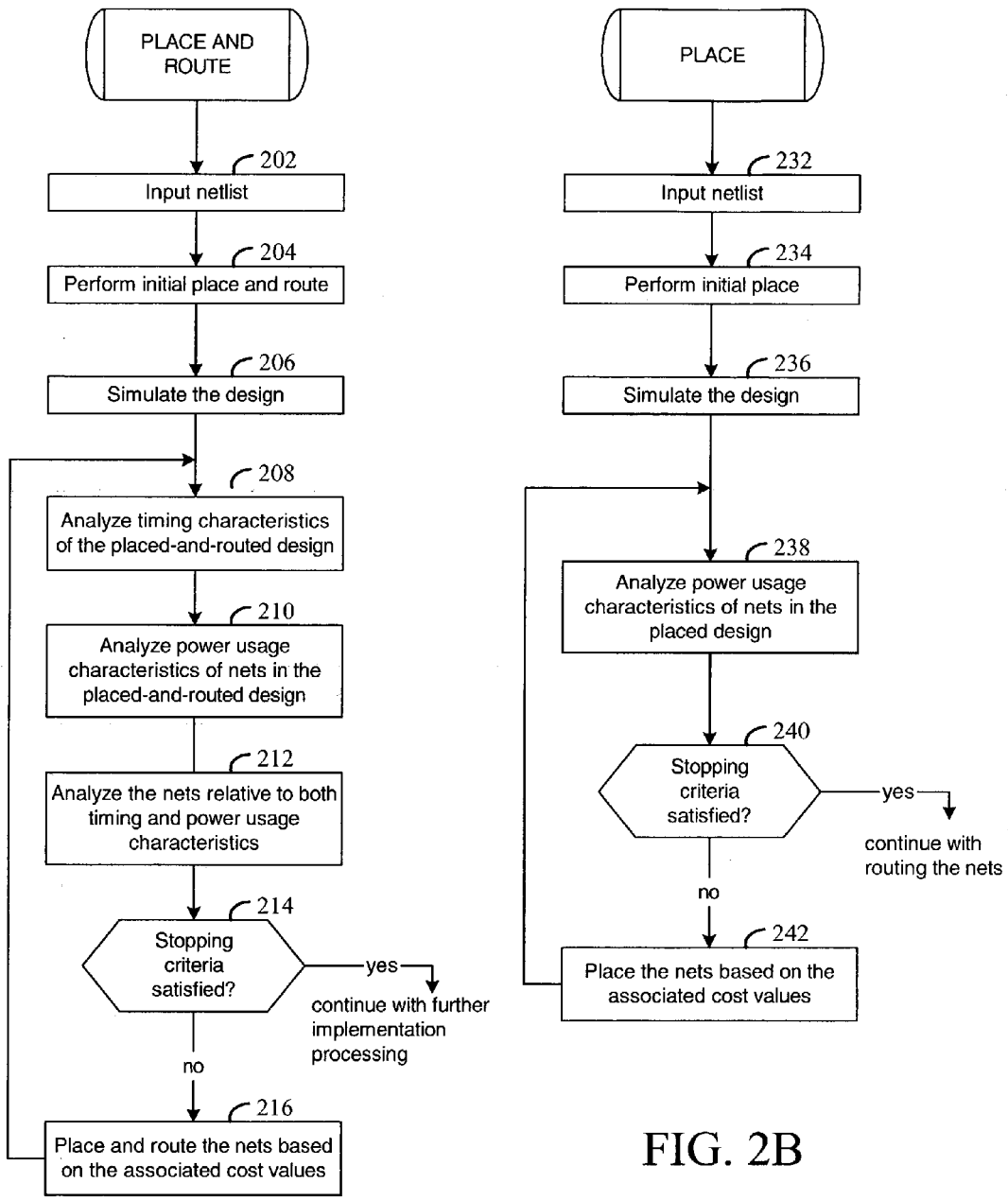
FIG. 2A is a flowchart of an example process for placing and routing a design in accordance with various embodiments of the invention.
FIG. 2B is a flowchart of an example process for placing a design.
Figure 2C:
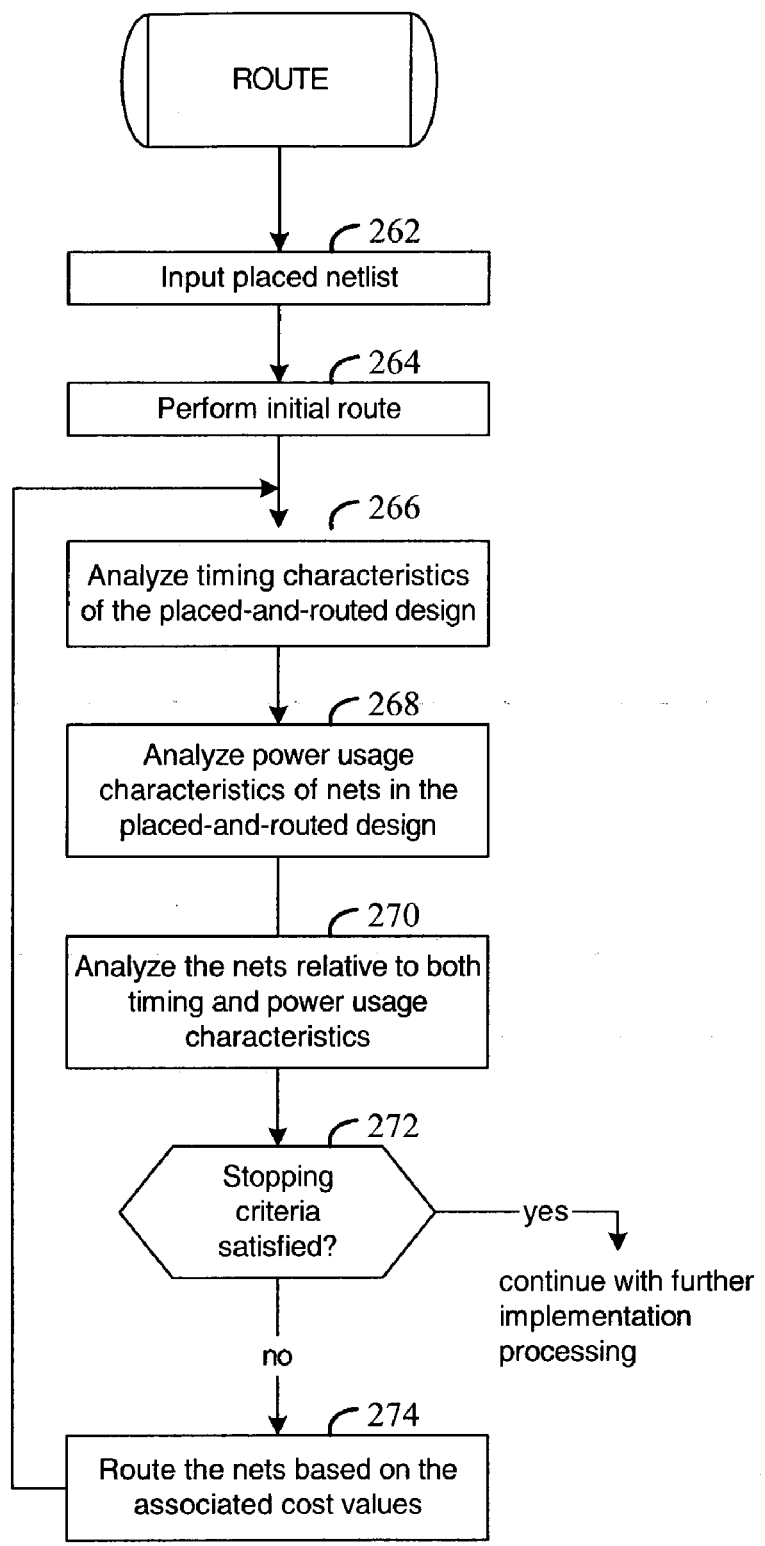
FIG. 2C is a flowchart of an example process for routing a design.

FIG. 2A is a flowchart of an example process for placing and routing a design in accordance with various embodiments of the invention. The process generates an initial placement and routing based on an input netlist (steps 202, 204). As indicated above, the placement and routing process may be performed as separate processes. However, in this flowchart, the placement and routing proceed together in order to satisfy selected design objectives such as timing and power consumption. Embodiments in which the design is placed and routed in separate processes are illustrated in FIGS. 2B and 2C.

In an example embodiment, the initially placed and routed design is simulated (step 206) in order determine the switching activity of the nets. The simulation may be performed using a testbench with a selected set of input vectors that are designed to produce expected behavior. Alternatively, random input vectors may be used. However, with random input vectors the observed switching activity may deviate from that which may be observed under normal operating conditions. In another embodiment, the switching activity level may be estimated without performing simulation. For example, U.S. Pat. No. 6,345,379 to Khouja et al. describes various methods for estimating switching activity or "transition density." The switching activity is subsequently used in analyzing power usage of the placed and routed design.

The timing analysis proceeds to determine whether the placed-and-routed design meets the timing requirements set forth by the designer (step 208) and in the process determines delay periods of the nets in the design.

Power analysis is then performed on the nets (step 210). In the example embodiments power analysis involves estimating power levels as a function of the switching activity and capacitance levels of the nets. During simulation the transitions of nets may be logged, and after simulation, the log file may be analyzed to determine for each net the total number of transitions over a period of time. From this, the switching activity may be determined as the number of transitions/unit time.

The nets are then analyzed relative to both the estimated power levels and the timing characteristics (step 210), and the nets are characterized by respective cost values. In an example embodiment, the cost function for a net may be cost=$A^*cost_{delay}+B^*cost_{power}+C^*$resource_cost, where A B C are constants that weight the importance of each cost factor, $cost_{delay}$ is a cost value determined for the level of delay of the net (from the timing analysis), $cost_{power}$ is a cost value determined for the estimated level of power consumed by the net (from the power analysis), and the resource_cost is a cost value determined from the routing resources that are consumed by the net. Those skilled in the art will appreciate that other cost functions may be employed, for example, the power level may be squared, in order to attach more importance to a particular characteristic.

The cost function also considers the criticality of the path to which the net belongs. This may be a part of $cost_{delay}$. A path is a series of logic blocks and routing wires that connect one flip-flop to another, and the critical path is the longest path in the design, which limits the speed of the overall design. Path criticality refers to how close a path is to being the critical path. It will be appreciated that optimizing a long net in a short path may not improve the speed of the design, whereas optimizing a short net in a critical path may improve the overall design speed.

If selected stopping criteria are satisfied, the placed-and-routed design is output for further implementation processing (decision step 214). Example stopping criteria include satisfying a user-defined target cost, iterating x number of times in placing and routing and in each iteration checking costs values, or the improvement with each iteration is less than a selected threshold.

If the stopping criteria are not satisfied, the process generates a new placed-and-routed design, attempting to optimize the placement and routing of those nets having the highest associated costs (step 216). Various approaches may be taken in optimizing the nets having the highest costs. For example, highest-cost nets are given priority over lower-cost nets whenever there is competition for the same resource. When iterating, highest-cost nets may be place or routed anew or incrementally evolved to reduce the costs. This may be based intelligently or even randomly (or pseudo-randomly). If the new random result is an improvement, the result is kept, otherwise the result is discarded.

It will be appreciated that the highest cost nets may be selected according to the associated cost value being greater than a selected threshold, the y nets with the greatest costs, or the nets having costs in the top z %, for example. The place and route capabilities of existing tools generally use cost factors in optimizing a design. After a new placed-and-routed version of the design has been generated, the process returns to step 208 for further analysis.

Existing place and route tools 114 may be adapted to also perform power analysis by first obtaining estimated power consumption levels of the nets in the design and then factoring the estimated power consumption levels into the cost value normally used by the tool. The power consumption levels may be obtained using known simulation tools, and modification of the cost function would generally not necessitate further changes in the place and route logic. Thus, the invention may be implemented without extensive modifications to existing tools.

FIG. 2B is a flowchart of an example process for placing a design in accordance with various embodiments of the invention. The process generates an initial placement based on an input netlist (steps 232, 234). In this embodiment, placement and power analysis are performed separate from and prior to routing of the design.

As with the embodiment of FIG. 2A, the design is simulated (step 236) in order to obtain the switching activity of the nets. Here too, in an alternative embodiment the switching activity levels may be obtained by estimation. The power usage characteristics of the placed design are then analyzed based on the switching activity levels of the nets and the distances between placed logic blocks (step 238). It will be appreciated that during placement, logic blocks of the design are placed, and during routing the logic blocks are connected by the implementing the nets. Routing may be viewed as the process of placing the nets. Since at this stage the logic blocks have been placed, but the nets have not been routed, the capacitance of a net is estimated as a function of the distances between the placed logic blocks. For example, the estimated net capacitance may be determined by computing the total distance from the source block to all target blocks. The power cost of a net may be represented as the product of the switching activity and the capacitance.

If selected stopping criteria are satisfied, the placed design is output for subsequent routing of the nets (decision step 240). Example stopping criteria include satisfying a user-defined target cost, iterating x number of times in placing and in each iteration checking cost values, or the improvement with each iteration is less than a selected threshold.

If the stopping criteria are not satisfied, the process generates a new placed design, attempting to optimize the placement of those nets having the highest associated cost values (step 242). It will be appreciated that the highest cost nets may be selected according to the associated cost value being greater than a selected threshold, the y nets with the greatest costs, or the nets having costs in the top z %, for example. After a new placed-and-routed version of the design has been generated, the process returns to step 238 for further analysis.

FIG. 2C is a flowchart of an example process for routing a design in accordance with various embodiments of the invention. In this embodiment, a previously placed design is routed using power analysis. The process generates an initial route based on an input placed netlist (steps 262, 264).

The process of FIG. 2C assumes that the switching activity of the nets has been previously determined by simulating the design, as described above in conjunction with the processes of FIGS. 2A and 2B.

The timing analysis proceeds to determine whether the placed-and-routed design meets the timing requirements set forth by the designer (step 266) and in the process determines delay periods of the nets in the design.

Power analysis is then performed on the nets (step 268). In the example embodiments power analysis involves estimating power levels as a function of the switching activity and capacitance levels of the nets, as explained above in FIG. 2A.

The nets are then analyzed relative to both the estimated power levels and the timing characteristics (step 270), and the nets are characterized by respective cost values. For example, step 212 of FIG. 2A sets forth that computing costs values as a function of the delay, estimated power consumption, resource costs, and criticality of paths.

If selected stopping criteria are satisfied, the placed-and-routed design is output for further implementation processing (decision step 272). Example stopping criteria include satisfying a user-defined target cost, iterating x number of times in routing and in each iteration checking costs values, or the improvement with each iteration is less than a selected threshold.

If the stopping criteria are not satisfied, the process generates a new routing of the design, attempting to optimize the routing of those nets having the highest associated costs (step 274). The various approaches mentioned in the place-and-route process of FIG. 2A may be employed in optimizing the nets having the highest costs. After a new routed version of the design has been generated, the process returns to step 266 for further analysis.

Figure 3:
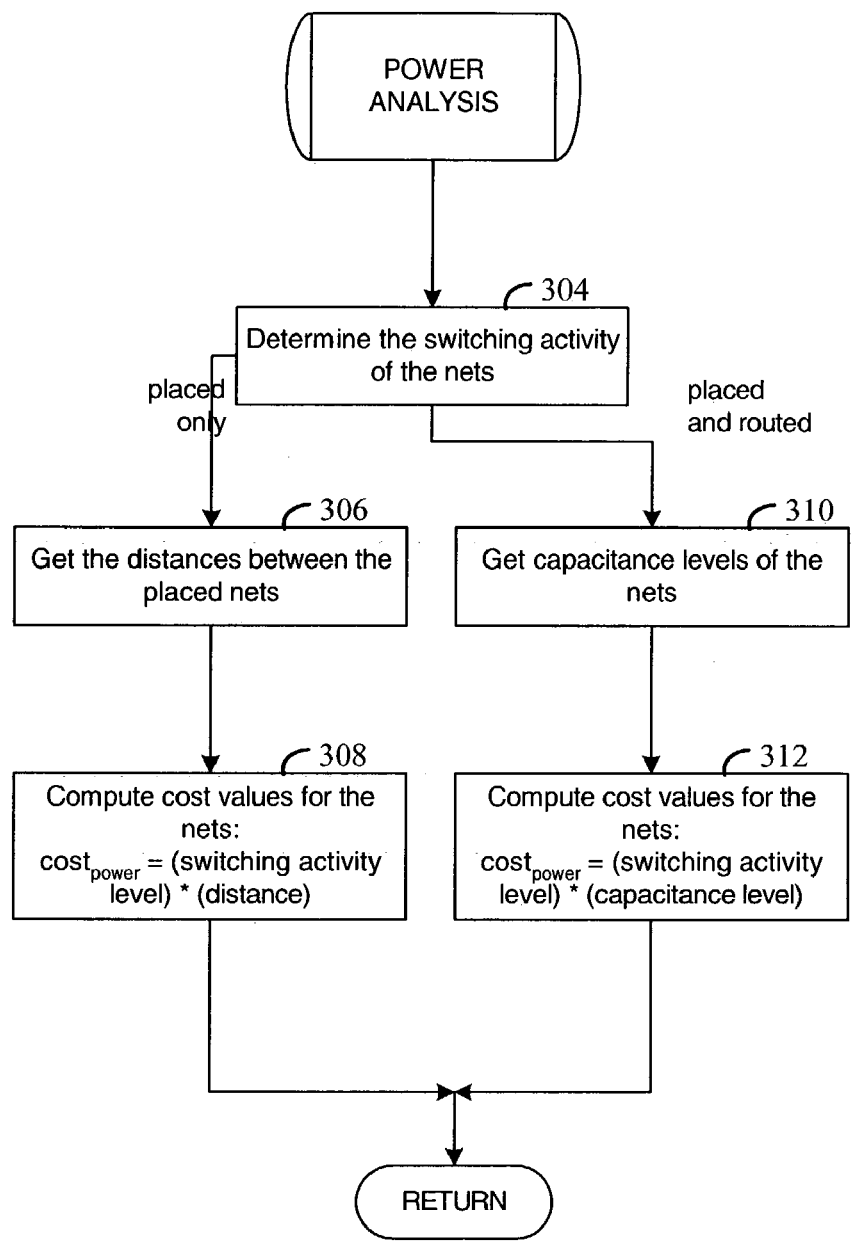
FIG. 3 is a flowchart of an example process for performing power analysis on the nets of a design.

FIG. 3 is a flowchart of an example process for performing power analysis on the nets of a design. In the example embodiments, power analysis considers switching activity levels and capacitance levels of the nets and generates cost values that are used in the process(es) for placing and routing the design (FIGS. 2A, 2B, and 2C).

The switching activity levels of the nets are determined via simulation or estimation as previously described (step 304). The cost values that are generated depend on whether the design has been only placed or both placed and routed.

For a placed-only design, the distances between the placed blocks are used as an approximation of the capacitance levels of the nets (step 306) in an example embodiment. Those skilled in the art will recognize that parameters other than distances that may be used. For example, in some devices, such as FPGAS, the routing architecture is such that in some cases longer distances may have less capacitance than shorter distances. For example, in at least one current FPGA routing architecture, the routes for traversing 2 tiles or 6 tiles are of lower capacitance than the capacitance of routes for traversing 4 tiles. Thus, it may be more desirable for a signal to traverse 6 tiles than 4 tiles, even though 4 tiles is closer. The distances between the nets can be determined from the associated placement coordinates. The cost value, $cost_{power}$ for a net in a placed-only design is $cost_{power}=$(switching activity level)*(distance), where the switching activity level is that associated with the net, and the distance is the "Manhattan" distance (the distance from coordinate (x1,y1) to (x2,y2) is (x2−x1)+(y2−y1)), for example (step 308). Other means of estimating capacitance using distance and architecture information may be used.

For a placed-and-routed design, the capacitance levels and switching activity levels of the nets are used to compute the cost values. The capacitance levels of the nets are derived from a characterization of the silicon technology on which the design is to be implemented (step 310). Characterization usually involves hardware measurements or simulation (e.g. SPICE simulations) of the underlying circuits. The cost value for a net in a place-and-routed design is $cost_{power}=$(switching activity level)*(capacitance level).

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for implementing electronic circuit designs and has been found to be particularly applicable and beneficial in the place and route stage of implementing a design. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for placing and routing an electronic circuit design, comprising:
   analyzing a current placed-and-routed electronic circuit design for power consumption characteristics and timing characteristics;
   generating a new current placed-and-routed electronic circuit design in response to the power consumption characteristics and timing characteristics of the current placed-and-routed electronic circuit design; and
   repeating the steps of analyzing the current placed-and-routed electronic circuit design and generating a new current placed-and-routed electronic circuit design until selected criteria are met; and
   wherein the power consumption characteristics include levels of expected switching activity of nets in the current placed-and routed electronic circuit design.

2. The method of claim 1, wherein the power consumption characteristics include levels of capacitance of nets in the current placed-and routed electronic circuit design.

3. The method of claim 1, further comprising simulating the current placed-and-routed electronic circuit design and determining switching activity of nets from simulating the current placed-and-routed electronic circuit design.

4. The method of claim 1, further comprising:
   associating respective cost values with nets in the current place-and-routed electronic circuit design, wherein each cost value is a function of respective power consumption characteristics and timing characteristics of the nets; and
   wherein generating the new current placed-and-routed electronic circuit design includes optimizing selected ones of the nets having associated cost values that do not satisfy selected criteria.

5. The method of claim 4, wherein each respective power consumption characteristic is a product of estimated switching activity of a net and estimated capacitance of the net, and each respective timing characteristic is an estimated delay of the net.

6. The method of claim 5, further comprising associating respective resource cost values with routing resources available in a target device, and wherein the respective costs values are further a function of the resource cost values of routing resources consumed by the nets.

7. A computer-implemented method for placing an electronic circuit design, comprising:
   analyzing a current placed electronic circuit design for power consumption characteristics;
   generating a new current placed electronic circuit design in response to the power consumption characteristics of the current placed electronic circuit design; and
   repeating the steps of analyzing the current placed electronic circuit design and generating a new current placed electronic circuit design until selected placement criteria are met; and
   wherein the power consumption characteristics include levels of expected switching activity of nets in the current placed electronic circuit design.

8. The method of claim 7, further comprising:
   generating a current placed-and-routed electronic circuit design from the current placed electronic circuit design when the selected placement criteria are met;
   analyzing the current placed-and-routed electronic circuit design for power consumption characteristics and timing characteristics;
   generating a new current placed-and-routed electronic circuit design from the current placed-and-routed electronic circuit design if the power consumption characteristics and timing characteristics do not satisfy selected placed-and-routed criteria; and
   repeating the steps of analyzing the current placed-and-routed electronic circuit design and generating a new current placed-and-routed electronic circuit design until the selected placed-and-routed criteria are met.

9. The method of claim 7, further comprising simulating the current placed electronic circuit design and determining the switching activity of nets from simulating the current placed electronic circuit design.

10. The method of claim 7, further comprising:
    associating respective cost values with nets in the current placed electronic circuit design, wherein each cost value is a function of respective power consumption characteristics and timing characteristics of the nets; and
    wherein generating the new current placed electronic circuit design includes optimizing selected ones of the nets having associated cost values that do not satisfy selected criteria.

11. The method of claim 10, wherein each respective power consumption characteristic is a product of estimated switching activity of a net and a distance value associated with the net, and each respective timing characteristic is an estimated delay of the net.

12. A computer-implemented method for placing and routing an electronic circuit design, comprising:
    simulating a current placed-and-routed electronic circuit design;
    deriving power characteristics of nets in the current placed-and-routed electronic circuit design as a function of data generated in simulating the current placed-and-routed electronic circuit design and estimated capacitance levels of the nets;
    determining timing characteristics of the current placed-and-routed electronic circuit design;
    associating respective cost values with nets in the current placed-and-routed electronic circuit design, wherein each cost value is a function of respective power characteristics and timing characteristics of the nets;
    selecting one or more nets having associated cost values that do not satisfy selected criteria;
    generating a new current placed-and-routed electronic circuit design while optimizing the one or more selected nets; and
    repeating the steps of deriving, determining, associating, selecting, and generating until selected criteria are met; and
    wherein the power consumption characteristics include levels of expected switching activity of nets in the current placed electronic circuit design.

13. An apparatus for placing and routing an electronic circuit design, comprising:
    means for analyzing a current placed-and-routed electronic circuit design for power consumption characteristics and timing characteristics;
    means for generating a new current placed-and-routed electronic circuit design in response to the power consumption characteristics and timing characteristics of the current placed-and-routed electronic circuit design; and
    means for repeating the steps of analyzing the current placed-and-routed electronic circuit design and generating a new current placed-and-routed electronic circuit design until selected criteria are met; and wherein the power consumption characteristics include levels of expected switching activity of nets in the current placed electronic circuit design.

14. An apparatus for placing an electronic circuit design, comprising:
   means for analyzing a current placed electronic circuit design for power consumption characteristics;
   means for generating a new current placed electronic circuit design in response to the power consumption characteristics of the current placed electronic circuit design; and
   means for repeating the steps of analyzing the current placed electronic circuit design and generating a new current placed electronic circuit design until selected placement criteria are met; and
   wherein the power consumption characteristics include levels of expected switching activity of nets in the current placed electronic circuit design.

15. An article of manufacture, comprising:
   a computer-readable medium configured with instructions for causing a computer to place and route an electronic circuit design with the steps of,
      analyzing a current placed-and-routed electronic circuit design for power consumption characteristics and timing characteristics;
      generating a new current placed-and-routed electronic circuit design in response to the power consumption characteristics and timing characteristics of the current placed-and-routed electronic circuit design; and
      repeating the steps of analyzing the current placed-and-routed electronic circuit design and generating a new current placed-and-routed electronic circuit design until selected criteria are met; and
      wherein the power consumption characteristics include levels of expected switching activity of nets in the current placed electronic circuit design.

16. An article of manufacture, comprising:
   a computer-readable medium configured with instructions for causing a computer to place an electronic circuit design with the steps of,
      analyzing a current placed electronic circuit design for power consumption characteristics;
      generating a new current placed electronic circuit design in response to the power consumption characteristics of the current placed electronic circuit design; and
      repeating the steps of analyzing the current placed electronic circuit design and generating a new current placed electronic circuit design until selected placement criteria are met; and
   wherein the power consumption characteristics include levels of expected switching activity of nets in the current placed electronic circuit design.

17. An article of manufacture, comprising:
a computer-readable medium configured with instructions for causing a computer to place and route an electronic circuit design with the steps of,
   simulating a current placed-and-routed electronic circuit design;
   deriving power characteristics of nets in the current placed-and-routed electronic circuit design as a function of data generated in simulating the current placed-and-routed electronic circuit design and estimated capacitance levels of the nets;
   determining timing characteristics of the current placed-and-routed electronic circuit design;
   associating respective cost values with nets in the current placed-and-routed electronic circuit design, wherein each cost value is a function of respective power characteristics and timing characteristics of the nets;
   selecting one or more nets having associated cost values that do not satisfy selected criteria;
   generating a new current placed-and-routed electronic circuit design while optimizing the one or more selected nets; and
repeating the steps of deriving, determining, associating, selecting, and generating until selected criteria are met; and
wherein the power consumption characteristics include levels of expected switching activity of nets in the current placed electronic circuit design.

* * * * *